(12) United States Patent
Sullivan et al.

(10) Patent No.: US 7,066,260 B2
(45) Date of Patent: Jun. 27, 2006

(54) DISSOLVING FILTER CAKE

(75) Inventors: Philip F. Sullivan, Bellaire, TX (US);
Curtis L. Boney, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 209 days.

(21) Appl. No.: 10/707,022

(22) Filed: Nov. 14, 2003

(65) Prior Publication Data

US 2004/0094300 A1    May 20, 2004

Related U.S. Application Data

(63) Continuation-in-part of application No. 10/227,690, filed on Aug. 26, 2002, now Pat. No. 6,938,693.

(51) Int. Cl.
*E21B 43/267* (2006.01)
(52) U.S. Cl. .................. 166/280.1; 166/283; 166/300; 166/308.1; 166/308.3; 507/265; 507/269; 507/277; 507/924
(58) Field of Classification Search ............. 166/280.1, 166/282, 283, 300, 308.1, 308.3; 507/265, 507/269, 277, 924
See application file for complete search history.

(56) References Cited

U.S. PATENT DOCUMENTS

| 3,353,600 | A |   | 11/1967 | Annis et al. |
| 4,848,467 | A |   | 7/1989  | Cantu |
| 4,957,165 | A |   | 9/1990  | Cantu |
| 4,986,355 | A |   | 1/1991  | Casad |
| 5,325,921 | A | * | 7/1994  | Johnson et al. .......... 166/280.1 |
| 5,330,005 | A |   | 7/1994  | Card |
| 5,439,055 | A |   | 8/1995  | Card |
| 5,501,275 | A |   | 3/1996  | Card |
| 5,551,516 | A |   | 9/1996  | Norman |
| 5,782,300 | A |   | 7/1998  | James |

(Continued)

FOREIGN PATENT DOCUMENTS

WO        03/023177         3/2003

OTHER PUBLICATIONS

M. Economides and K. Nolte, eds., *Reservoir Stimulation*, $3^{rd}$ edition, John Wiley & Sons, Ltd, New York (2000) pp. 10-21 to 10-24.

(Continued)

*Primary Examiner*—George Suchfield
(74) *Attorney, Agent, or Firm*—Thomas O. Mitchell; David Cate; Tim Curington (57) ABSTRACT

Methods are presented to induce a screenout during a subterranean formation fracturing or combined fracturing and gravel packing treatment having a viscoelastic surfactant-based carrier fluid by laying down a filter cake at least a portion of which is a base-soluble material, injecting proppant slurry, and causing hydrolysis and dissolution of the solid base-soluble material by adding base so that leak-off increases, the concentration of proppant in the fracture increases, and the proppant screens out. A method of gravel packing with a viscoelastic surfactant-based carrier fluid by laying down a filter cake at least a portion of which is a base-soluble material, injecting gravel, and causing hydrolysis and dissolution of the solid base-soluble material by adding base. Methods of slowing or accelerating the hydrolysis and dissolution are given, and addition of bridging-promoting materials is included.

29 Claims, 1 Drawing Sheet

U.S. PATENT DOCUMENTS

| | | |
|---|---|---|
| 5,964,295 A | 10/1999 | Brown |
| 5,979,555 A | 11/1999 | Gadberry |
| 5,979,557 A | 11/1999 | Card |
| 6,258,859 B1 | 7/2001 | Dahayanake |
| 2003/0062160 A1 | 4/2003 | Boney et al. |
| 2003/0106690 A1 | 6/2003 | Boney et al. |
| 2004/0094301 A1 | 5/2004 | Hughes et al. |
| 2004/0221989 A1 | 11/2004 | Zhou et al. |

OTHER PUBLICATIONS

F. L. Monus, F. W. Broussard, J. A. Ayoub and W. D. Norman, "Fracturing Unconsolidated Sand Formations Offshore Gulf of Mexico," SPE 24844, (1992).

* cited by examiner

FIGURE 1

DISSOLVING FILTER CAKE

CROSS REFERENCE TO RELATED APPLICATIONS

This application is a Continuation-in-Part of U.S. patent application Ser. No. 10/227,690 filed on Aug. 26, 2002 now U.S. Pat. No. 6,938,693.

BACKGROUND OF INVENTION

This Invention relates to increasing the flow of fluids into or out of subterranean wells. More particularly it relates to stimulation of the flow of fluids from the rock of a formation into a wellbore. Most particularly it relates to methods of controlling the size and shape, location, and quality of fractures created in hydraulic fracturing (either conventional or with coiled tubing), or in fracturing and gravel packing in one operation, and to gravel packing.

Hydraulic fracturing, gravel packing, and fracturing and gravel packing in one operation, are used extensively to stimulate the production of hydrocarbons, water and other fluids from subterranean formations. These operations involve pumping a slurry of "proppant" in hydraulic fracturing (natural or synthetic materials that prop open a fracture after it is created) or "gravel" in gravel packing. In high permeability formations, the goal of a hydraulic fracturing treatment is typically to create a short, wide, highly conductive fracture, in order to bypass near-wellbore damage done in drilling and/or completion, to ensure good communication between the rock and the wellbore and to increase the surface area available for fluids to flow into the wellbore. Gravel is also a natural or synthetic material, which may be identical to, or different from, proppant. Gravel packing is used for "sand" control. Sand is the name given to any particulate material, such as clays, from the formation that could be carried into production equipment. Gravel packing is a sand-control method used to prevent production of formation sand, in which a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations to be hydraulically fractured are frequently poorly consolidated, so that sand control is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), and gravel packing, and mean them all.

It is very undesirable to allow the proppant or gravel to pack the wellbore above the producing formation. If this happens, the wellbore must be cleaned out to permit various other downhole operations, such as placement of tools, to permit optimal fluid production. It is also very undesirable if, instead of generating a short, wide fracture, a fracturing or frac and pack treatment screens out too late or not at all, that is if the fracture keeps growing, in length and/or in height, beyond what is necessary and desired; then an optimal pack and the desired fracture size and shape are never generated to maximize production and to prevent flowback of proppant or sand.

As mentioned, short, wide fractures are often desired. The most common method of creating short-wide fractures is to initiate a tip screenout ("TSO") during the pumping operation. In a tip screenout, the solids concentration at the tip of the fracture becomes so high due to fluid leak-off into the formation that the slurry is no longer mobile. The concentrated proppant slurry plugs the fracture, and prevents additional fracture growth. Additional pumping of the proppant/ fluid slurry into the formation after the screenout causes the fracture to grow wider, and large concentrations of proppant per fracture surface area are placed in the fracture. The design of these treatments to cause a tip screenout as desired relies heavily on correctly knowing the mechanical properties, permeability, reservoir pressure and fluid saturations of the formation being treated. Prior to most of these treatments a small fracturing treatment (sometimes called a "data frac" or "mini-frac") is performed in order to measure these properties and to determine the formation's response to a hydraulic fracturing treatment. Treatment designs are often modified on the fly to incorporate this new information. Important design parameters are the size of the pad, the size and number of stages, and the proppant or gravel concentration in each subsequent stage, and the nature of the fluid and additives used in each stage. Treatment design and modification is typically done with the aid of a computer model, many of which are available in the industry. Operators use the available information and models to attempt to design the jobs so that tip screenouts will occur as desired.

The pad is the proppant-free fluid pumped to initiate and propagate a fracture before stages including proppant or gravel are started. It typically serves another purpose as well. It lays down a coating, called a "filter cake", on the faces of the forming fracture. This filter cake (and that formed during injection of proppant or gravel) reduces the flow of fluid from the wellbore, perforations, and/or fracture into the formation (affecting the "efficiency" of the job (see below)). The filter cake may be formed from the viscosifying agents that are normally present, if they are polymers or crosslinked polymers. The filter cake may also be formed by adding additional materials to the fluid for that purpose, especially if the pores in the fracture face are large. Such optionally added materials in this use are typically called fluid loss control additives, or FLA's.

In hydraulic fracturing, in particular in low permeability formations where the longest possible fracture is desired (in order to create the largest possible fracture face for flow of fluids into the fracture and ultimately into the wellbore), modes of operation that might induce a tip screenout are typically avoided, in order to achieve long, conductive fractures. If a tip screenout is encountered in such a fracturing operation before the entire designed treatment is pumped, as inferred from an increase in pumping pressure, the pump rate is reduced or most likely the treatment is stopped and considered a failure. We will call hydraulic fracturing job designs and job executions in which a tip screenout is not desired and does not occur, "conventional" hydraulic fracturing.

On the other hand, as discussed above, sometimes tip screenouts are desired. Design features employed in those special situations in which a tip screenout is desired typically involve methods of ensuring that fluid leak-off is high relative to the rate and amount of proppant injection. This can be achieved by using a small pad, using little or no fluid loss additive, using higher proppant concentrations earlier in the treatment, pumping more slowly, and other methods known to those skilled in the art of fracturing, gravel packing, and combined fracturing/gravel packing.

Unfortunately, in spite of data-fracturing information, pressure transients collected by downhole pressure gauges during treatments have indicated that TSO's do not occur in many, perhaps the majority, of the treatments in which they are desired and intended. The fluid at the tip of the fracture remains mobile, the fracture tip continues to grow throughout the treatment and the desired proppant concentration in the fracture is not reached. Therefore, the desired fracture conductivity is not obtained. Often, TSO's have to be coaxed by lowering pump rates or increasing proppant concentrations at the time in the treatment when the TSO is desired.

There are two principal reasons for not achieving an appropriate TSO. First, the fracture may be too large for the proppant volume. This occurs a) when the pad is too large or b) when the "efficiency" is too high, or c) when the ratio of proppant volume to slurry volume selected in the design of the job is not high enough. (The "efficiency" in a fracturing operation is high when fluid leak-off is controlled—either naturally by the properties of the fluid and the matrix, or by the addition of fluid loss control additives—to an acceptably low level; efficiency is low when leak-off is high, so that very large volumes of fluid must be pumped in order to generate the intended fracture size and shape and to place a specified amount of proppant or gravel; efficiency is high when there is very little leak-off and so most of the injected fluid is used to enlarge the fracture.) Second, the fracture width may be too great for the proppant to form a bridge in the fracture. This may be due to bad initial design (for example in choice of proppant diameter) or to width growth beyond what was expected.

Up until now, the major way to deal with these problems was directed towards optimizing a) the choice of fluid loss control additive or additives and b) the selection of the stages of the job in which they were used and their concentration(s), especially if the main problem was that the fracture was too large for the proppant volume.

Fibers are used in fracturing to control proppant flowback. In that case, fiber is added at an optimal concentration to control proppant flowback while not significantly impacting fracture conductivity. If one is using glass fibers, for example, this concentration is approximately 1 weight percent by weight of the proppant. This concentration is insufficient to cause bridging during pumping under the conditions at which it is normally employed, especially in low permeability formations. Fibers are also used sometimes to aid in transport of proppant when the viscosity of the fluid is very low. Tip screenout is commonly deliberately avoided in these treatments; proppant concentrations are kept low through careful pre-treatment job design, especially through careful selection of pumping schedules. For example, in these treatments the pad volume is increased over conventional job designs to ensure that sufficient fracture width is generated prior to the proppant/fiber slurry entering the fracture. However, U.S. patent application Ser. No. 10/214,817 (assigned to Schlumberger Technology Corporation, filed Aug. 8, 2002, hereby incorporated in its entirety by reference) describes a method of deliberately using fibers to enhance tip screenout when desired.

U.S. patent application Ser. No. 10/227,690 (assigned to Schlumberger Technology Corporation, filed on Aug. 20, 2002, hereby incorporated in its entirety by reference) described chemical methods of inducing tip screenouts by causing at least part of the filter cake to degrade at the desired point by incorporating a filter cake degradation agent or agents, and optionally a filter cake degradation agent aid in the pad and/or in one or more stages of the main proppant carrying fracturing fluid. This method depends more upon features of the job under the operator's control (especially the chemistry of the fluids and fluid loss control additives used) than on the unknown variability of the formation. However, the scheduling of the inclusion in the fluid of the filter cake degradation agent(s), and optional filter cake degradation agent aid(s), may be complicated.

Removal of the filter cake serves another purpose. After the treatment has been completed, the well is put on production and the operator wishes to maximize the flow of fluid from the formation into the wellbore. The filter cake that was needed to reduce leakoff impedes this flow. In gravel packing, although there is no need to induce a tip screenout there is still a good reason to remove the filter cake.

There is a need for a simpler, reliable way to ensure that filter cakes can be removed and that intended tip screenouts will occur exactly when and where they are wanted and to allow for great flexibility in the design of tip screenout treatments.

SUMMARY OF INVENTION

One embodiment of the Invention is a method of causing a screenout in a subterranean formation stimulation treatment in which a slurry of a proppant in a viscoelastic surfactant based carrier fluid is injected above fracturing pressure to create one or more fractures, by forming a filter cake including a solid base-soluble material, and degrading the solid base-soluble material with a solid base-soluble material degradation agent while injecting a slurry of a proppant in a carrier fluid. In one embodiment the solid base-soluble material degradation agent is a base, preferably an alkali metal alkoxide, alkali metal carbonate, alkali metal bicarbonate, alkali metal hydroxide, ammonium hydroxide, or a mixture of one or more of these. In another embodiment the carrier fluid contains a buffer. In another embodiment the carrier fluid contains a fluid loss additive.

In yet another embodiment, the solid base-soluble material is one or more of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of the these. The solid base-soluble material is preferably polyglycolic acid. In another embodiment the solid base-soluble material is mixed with a solid acid-reactive material, preferably selected from magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass. The solid base-soluble material and solid acid-reactive material may be in separate particles or in the same particle; the solid base-soluble material may enclose the solid acid-reactive material. In any case, the solid base-soluble material may be coated with a hydrolysis-delaying material.

In other embodiments either or both of the solid base-soluble material and the solid base-soluble material degradation agent may be added to the pad, to the early proppant-carrying stages, or to the later proppant-carrying stages. In another embodiment bridging-promoting material may be included in any or all stages of the treatment. In another embodiment, fluid loss additives other than or in addition to the solid base-soluble material may be included in any stage.

Yet another embodiment is a method of gravel packing a subterranean formation that involves injecting a slurry of a gravel in a viscoelastic surfactant based carrier fluid that contains a solid base-soluble material that forms a filter cake and degrading the filter cake with a filter cake degradation agent while injecting a slurry of a gravel in a carrier fluid. Solid base-soluble materials, bases, optional solid acid-reactive materials, optional base-soluble material degradation agents, and optional bridging promoting materials are the same as for fracturing. The gravel packing may be done with or without a sand control screen. Yet another embodiment is a viscoelastic surfactant based well treatment composition containing water and a solid base-soluble material.

DETAILED DESCRIPTION

To aid in understanding deliberate tip screenouts promoted by job design in hydraulic fracturing and combined fracture/gravel packing operations, see M. Economides and K. Nolte, eds., Reservoir Stimulation, $3^{rd}$ edition, John Wiley & Sons, Ltd, New York (2000) pp 10–21 to 10–24; and F. L. Monus, F. W. Broussard, J. A. Ayoub and W. D. Norman, "Fracturing Unconsolidated Sand Formations Offshore Gulf of Mexico," SPE 24844, (1992). We have now found a simple, reliable method to bring about screenouts in a fracture deliberately and in a controlled manner by using a specially selected material as at least a part of the fluid loss additive and then making a single simple change in the composition of the injected fluid. The method is particularly effective when the failure to screen out is due to the fracture being too large for the proppant volume. The method is to form a filter cake including or consisting entirely of a special fluid loss additive material, which is a solid base-soluble material, and then to reduce the amount of filter cake, or increase its permeability, at the appropriate time by adding base to the carrier fluid. (See below for broader definitions of "base" and "base-soluble".) The material that forms a filter cake is called a "fluid loss additive" or "FLA". The FLA may be entirely a solid base-soluble material, or may contain one or more other components. Generically, then, the solid base-soluble material is a "fluid loss additive or component". We will use the term filter cake degradation to encompass reducing the amount of filter cake or increasing its permeability by dissolving at least a portion of the filter cake. (When "a portion" of the filter cake is dissolved, and the solid base-soluble material is only a component of the fluid loss additive, all of the solid base-soluble material may or may not be dissolved.) This is done by dissolving at least a portion of the specially formulated filter cake quickly and at a desired point during the job by adding a base to the fluid at the appropriate time. Normally the time at which the operator will start adding base to the fluid will be determined during the job design, but this time can be decided (or finalized) during the data frac or even during the treatment if necessary because only a single additive is to be changed.

If the failure to screen out is due in part to the fracture width being too great to allow for effective bridging of the proppant, fibers or other materials (termed bridging-promoting materials) may be added to the proppant to assist in bridging, in conjunction with the above method of dissolving the filter cake with a base. These techniques involving dissolving the filter cake and adding fibers may be combined simultaneously or consecutively.

The method of the Invention is also applicable to forming and then destroying a filter cake in gravel packing. The method of the Invention may also be used to form wider fractures (that have greater fracture conductivity) deliberately. The method of the Invention may also be used as a form of diversion; that is, the operator may deliberately stop the growth of one fracture and then initiate a new fracture without zonal isolation. The method of the Invention may be used to destroy the FLA throughout the fracture or only in part of it. The operator may decide and control when and where the screenout occurs (and avoid the undesirable results of failure to screen out, of very gradual and inefficient screenout, or of screenout in the wellbore above the formation) by accelerating the leak-off, and optionally also by assisting proppant bridging (as will be discussed below).

The underlying and unifying concept is that a filter cake is laid down early in the treatment, then proppant or gravel slurry is injected, and then while proppant or gravel slurry injection continues at least a portion of the filter cake is chemically damaged by dissolution so that leak-off increases. If the treatment involves fracturing, including combined fracturing and gravel packing, then the concentration of proppant in the fracture increases, and the proppant screens out. Although the method of the Invention may be used in treatments other than fracturing and for purposes other than inducing screenouts, the following discussion will be primarily in terms of inducing screenouts in fracturing.

Solid base-soluble materials that are fluid loss additives, or fluid loss additive components, suitable for use in the present Invention include solid cyclic dimers, or solid polymers, of certain organic acids, that hydrolyze into soluble products readily in the presence of base. One example of a suitable solid acid-precursor is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of gylycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

Cargill Dow, Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™ PLA. The PLA's currently available from Cargill Dow have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze.

Other materials suitable as solid acid-precursors are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355. These patents describe the use of these materials as fluid loss additives. U.S. Pat. No. 4,986,355 describes a method of manufacturing these materials in the fine particle sizes most appropriate for fluid loss control.

During fracturing, more filter cake is laid down in the portion of the fracture closest to the wellbore because the fracture face closest to the wellbore has been exposed to filter cake-forming fluids for the longest time and at the highest pressure. Furthermore, that filter cake is more difficult to remove by dissolution with base than filter cake farther toward the fracture tip. One reason is that injected fluids cool the formation, and the formation closest to the wellbore is the coolest; hydrolysis and dissolution of the solid base-soluble material is slower at lower temperatures. Also, during the fracturing treatment, more fluid has leaked off into the formation through the fracture face nearest to the formation due to the longer time and higher pressure. Late in the treatment this fracture fluid in the formation and thicker filter cake impedes additional flow through the filter cake. Since the hydrolysis and dissolution by base requires flow of the base into and away from the filter cake this is most difficult closest to the wellbore. Consequently, even though the base contacts the filter cake closest to the wellbore first and for the longest time, filter cake towards the tip is degraded more effectively. Fracturing treatments with deliberate TSO's in high permeability formations are usually fairly short treatments. Typical times are 30 to 45 minutes; treatments may occasionally take as little as about 15 minutes or as much as up to about 1.5 hours. Addition of base is begun at a time calculated so that sufficient destruction of the filter cake occurs at the time that the screenout is desired. In many jobs, the start of base addition approximately coincides with the start of proppant; in longer jobs, base may be started significantly after proppant. In very short jobs, and in gravel packing, base may be included in the pad from the start of the job.

In treatments at high temperature or for long times, in which the rapid filter cake dissolution is initiated by the addition of base to the injected fluid but in which there may be some concern that the filter cake might dissolve too readily, the job design is adjusted so that solid base-soluble material is added only early in the job and the filter cake near the wellbore does not consist of or include solid base-soluble material. This strategy is also advantageously used in cases where solid base-soluble material is difficult to obtain or more expensive than other fluid loss additives.

The rate and the extent of filter cake dissolution at a given location depend primarily upon the composition, particle size, and surface area of the solid acid-soluble material chosen, the thickness of the filter cake, the temperature, and the strength of the base. Other job design parameters that may be important are the duration of the job, the planned dimensions of the fracture, and the proppant particle size. For example, the pad must be pumped long enough and/or contain enough FLA to ensure laying down the needed filter cake. Also, the filter cake degradation must not be so slow that screenout does not occur or occurs too late. Proppant addition is usually done in stages. In each stage a certain proppant concentration is injected for a certain amount of time. Successive stages usually have successively increasing proppant concentrations. The proppant concentration may also be ramped smoothly, that is increase continuously during the proppant-laden stages. To aid in description, a typical job will be broken up into the pad and discreet proppant slurry stages. In the pad, the fracture is initiated and filter cake is laid down. In the subsequent proppant slurry stages, the fracture is enlarged. In the last proppant slurry stage, a screenout occurs and the fracture is packed with proppant. If the pad must be small because of other aspects of the job design, laying down of filter cake may continue in all of, or the early, proppant slurry stages. A bridging-promoting agent may be added in any or all of the pad and stages. One skilled in the art of subterranean formation stimulation could design treatments that generate a fracture having specific final parameters (such as dimensions and conductivity) in many different ways within the scope and spirit of the Invention, depending upon such factors as, for example, the availability of chemicals and materials; the availability and capability of the equipment with which the chemicals and materials can be added; and cost.

The Invention is preferably carried out by first considering information about the well, the formation, the fluids available, and criteria for a successful fracture stimulation with a tip screenout, and then preparing an optimized plan for maximizing stimulated well performance according to the data and the criteria. Such a design will include injection of an amount of a selected pad fluid containing a selected FLA, and then injection of one or more stages containing selected types and concentrations of fracture fluids, proppants, FLA's (if present) and bases (if present). This is usually done by analyzing the well using fracturing design and evaluation software in which pressure gradients are combined with fracture length and height evolution algorithms, complete leak-off information, and the effects of multiple fluid injections and their temperature changes.

The job design will typically include the rates and volumes of fluids and solids to be injected in each stage of the job, including the desired fluid leak off rate, and the time at which the TSO is desired. The special and temporal temperature distribution during the job will be predicted. The operator then has several design parameters that can be adjusted in order to ensure that an appropriate amount of the solid base-soluble material has dissolved at the appropriate time. The major adjustable design parameters for bringing this about are the nature of the solid base-soluble material (chemical composition, particle size and shape), other components added with the solid base-soluble material (delaying or accelerating agents to be described below), and the pH of the fluid and the way the pH is optionally varied during the job. A particularly desirable dissolution mode is slow or negligible dissolution up to certain point and then rapid or extensive dissolution thereafter. Simple laboratory experiments are used to determine the rate at which a given base-soluble material will dissolve under given conditions in a given chemical environment.

The effects of one important variable on dissolution rate of solid base-soluble material (chemical composition, particle size and shape) have already been detailed. Within the limits of cost and availability, various solid base-soluble material compositions and physical properties may be chosen. (The shape and particle size must also be chosen with the required fluid loss and filter cake properties in mind, as discussed elsewhere.) Another important variable is the temperature. (The temperature of a formation is normally inherently reduced by injection of fluids and can sometimes be reduced further by deliberate injection of more fluid for example a larger pad—than otherwise called for by the design. Either way, the temperature will be known, and the spatial and temporal temperature profile will simply be called "the temperature" here.) A third important variable is the pH of the fluid(s) with which the solid base-soluble material will come in contact ads it is being injected and when it is in a filter cake. Laboratory experiments are used to determine the dissolution rate of a given material at a given temperature and pH.

Higher pH and higher temperature accelerate the dissolution. It should be understood that the solid "base-soluble" materials used in the Invention will in fact eventually hydrolyze and dissolve in aqueous fluids of any pH at any temperature. However, at low pH's and/or low temperatures, this dissolution could take years, whereas for the purposes of the Invention the dissolution should take place within a time span of at least a few minutes to at most a few hours. Consequently, at high temperatures (for example above about 115° C.) it might be necessary to use measures to slow the hydrolysis and dissolution whereas at low temperatures (below, for example about 65° C.) it might be necessary to take steps to accelerate the hydrolysis and dissolution. Methods of slowing the hydrolysis include, by non-limiting example, lowering the pH or buffering the fluid at a lower pH. Another method is to coat the solid base-soluble material. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid base-soluble materials by any means delays the hydrolysis. Note that coating here may refer to encapsulation or simply to changing the surface by chemical reaction or by forming or adding a thin film of another material. Another suitable method of delaying the hydrolysis of the solid base-soluble material is to suspend the solid base-soluble material, optionally with a hydrophobic coating, in an oil or in the oil phase of an emulsion. The hydrolysis and dissolution do not occur until water contacts the solid base-soluble material. Methods of increasing the hydrolysis include, by non-limiting example, increasing the pH or buffering the fluid at a higher pH. Another method of accelerating the hydrolysis and dissolution is to incorporate with the solid base-soluble material (in the same or different particles, typically in the same particle, optionally coating or coated by the solid base-soluble material) an agent that reacts with the acid generated by the hydrolysis. Non-limiting examples are magnesium oxide and calcium carbonate. This is discussed in detail elsewhere. Note that although, depending upon the circumstances, control of the hydrolysis and dissolution rate by control of the pH may involve increasing, decreasing or buffering the fluid, just as the term "base-soluble material" is used throughout this discussion for simplicity, a change of the pH is usually described in terms of addition of base.

For a given treatment there are often several strategies that may be used. For example, a combination of chemicals and job design may be chosen so that the solid base-soluble material hydrolyzes and dissolves slowly throughout the treatment, and the destruction of the filter cake reaches a point at which leak-off causes a screenout at the desired time. In some jobs this may be accomplished without changing the fluid composition during the job. On the other hand, a combination of chemicals and job design may be chosen so that the solid base-soluble material does not hydrolyze and dissolve at an appreciable rate until the operator makes a sudden change in the composition of the injected fluid, for example adds strong base, so that the filter cake dissolves quickly as soon as that fluid contacts it. This strategy may give the operator greater control during the treatment. The availability of chemicals and equipment may also be inputs in selection of a treatment design.

For hydraulic fracturing or gravel packing, or a combination of the two, aqueous fluids for pads or for forming slurries are viscosified. Polymers (usually polysaccharides crosslinked with a boron, zirconium or titanium compound) are commonly used as viscosifying agents. A portion of the polymers also typically end up as major (or sole) components of the filter cake. However, the viscosity of these polymer or crosslinked-polymer fluids is often affected by strong base, and polysaccharide polymers are not readily destroyed by base so they are not be used in the present Invention. On the other hand, certain surfactants, especially viscoelastic surfactants ("VES's") form appropriately sized and shaped micelles that viscosity aqueous fluids. These micelles and surfactants are not affected by base, and the surfactants do not form filter cakes, so surfactants are the preferred viscosifiers in the method of the present Invention. Small amounts of polymers may be used to increase the viscosity or for purposes other than viscosifying, for example as friction reducers; this will not be deleterious to the method of the Invention. Any surfactant-viscosified fracture or gravel packing fluid may be used in the Invention, provided that it is compatible with the special materials of the Invention (the FLA and the base), and with the formation, the proppant, and the desired results of the treatment. Any VES based fluid can be used, in or after the pad, that is compatible with the formation, the formation fluids, and any additives, especially the base. Particularly effective VES based fluids are those described in U.S. Pat. Nos. 5,551,516; 5,964,295; 5,979,555; 5,979,557; and 6,258,859; and U.S. patent application Ser. No. 10/250,416 (assigned to the same assignee as the present application) and Ser. No. 10/250,417 (assigned to the same assignee as the present application), all hereby incorporated by reference. Some of the VES fluids described are normally used at pH's of as much as 12.5 or higher, in which case they would preferably be used for the current Invention in short treatments and without additional base. Breakers may also be used for VES's provided that they are not strong bases (unless the intended job is to be very short) and provided that they are compatible with strong bases.

Normally, it is known from the start of the design of the treatment that a TSO is desired, and the method of the Invention is incorporated into the original job design. However, it is possible, and within the scope of the Invention, that the job may be designed without planning a TSO, or with an optional TSO, and then it can be decided during the job execution that a TSO is desired (or may not occur as planned) and the job can be modified on the fly accordingly. (Note that in this description, we often refer to any screenout in the fracture as a tip screenout (TSO), but by TSO we include here a screenout that occurs in the fracture and not necessarily at the very end of the fracture farthest from the wellbore; what is critical is that the screenout does occur, that it occurs when it is desired, and that it occurs in the fracture and not in the wellbore.

We shall use the term "conventional fracturing" here to refer to hydraulic fracturing in which a tip screenout is neither intended nor desired. In conventional fracturing, modes of operation that might induce a tip screenout are avoided. If a tip screenout is encountered or appears imminent in a conventional fracturing operation, as inferred from an increase in pumping pressure, before the entire designed treatment is pumped, some change may be made on the fly in the job parameters, for example pump rate or proppant concentration, to try to minimize the tendency toward tip screenout. Frequently, however, the treatment is stopped and considered to be a failure.

The pad of the Invention comprises a carrier fluid and a VES. It may additionally contain other additives normally used in such fluids, provided that none of the components of the pad is deleterious to the formation or to the fracture fluid. Fluids used as the pad in the present Invention may typically contain materials such as corrosion inhibitors, friction reducers, clay stabilizers, scale inhibitors, biocides, and the like.

The carrier fluid provides a medium for the transport of the other components into the formation. Preferably, the carrier fluid is water or brine. Selected organic or inorganic salts or mixtures can be included, provided that they are compatible with all components in the pad, the fracture fluid, the formation and the formation fluids. Solutions containing from about 1 to about 7% by weight potassium chloride (KCl) or ammonium chloride are often used as the base liquid in fracturing fluids and pads to stabilize clays and prevent clay swelling. Sometimes other brines or seawater are used. An organic cation salt, such as, in particular, tetra methyl ammonium chloride, is an effective salt, especially but not limited to about 0.2 to about 0.5 percent by weight.

FLA's may also include additional solids such as but not limited to magnesia, aluminum hydroxide, calcium carbonate (calcite), calcium oxalate, calcium phosphate, aluminum metaphosphate, sodium zinc potassium polyphosphate glass, sodium calcium magnesium polyphosphate glass, asbestos, granular starch, particulate mica, plastic particles, solid wax or wax-polymer particles, solid oil-soluble resin particles, insoluble salts, slowly soluble salts (such as sodium chloride if the carrier fluid and formation water have high ionic strengths), and mixtures thereof. Some of these will dissolve rapidly in base; some will not. Some will eventually dissolve or degrade over time; some will not. It is not necessary for all of the filter cake to dissolve, or even for all of the solid base-soluble material in the filter cake to dissolve. It is only necessary that enough filter cake dissolve that the fluid loss increases to the point that a screenout occurs.

Mixtures of one or more solid base-soluble materials and one or more other FLA components may be purely physical mixtures of separate particles of the separate components. The mixtures may also be manufactured such that one or more solid base-soluble materials and one or other FLA components is in each particle. This may be done, by non-limiting examples, by coating the other FLA component with the solid base-soluble material, or by heating a physical mixture until the solid base-soluble material melts, mixing thoroughly, cooling, and comminuting. For example, it is common practice in industry to co-extrude polymers with mineral filler materials, such as talc or carbonates, so that they have altered optical, thermal and/or mechanical properties. Such mixtures of polymers and solids are commonly referred to as "filled polymers". When the other FLA component is completely enclosed within the solid base-soluble material, the other FLA component may be water-soluble, for example boric acid or borax. In any case it is preferable for the distribution of the components in the mixtures to be as uniform as possible. The relative amounts of the components may be adjusted for the situation to control the solid base-soluble material reaction rate. The most important factors will be the temperature at which the treatment will be carried out, the pH of the aqueous fluid or fluids with which the mixture will come into contact, and the time desired for dissolution of the mixture.

The solid base-soluble material or the mixture of solid base-soluble material and other FLA component may be manufactured in various solid shapes, including, but not limited to fibers, beads, films, ribbons and platelets. An advantage of the method of the Invention is that, for a given oilfield treatment, the appropriate solid base-soluble material may be selected readily from among many available materials that have different hydrolysis and dissolution rates. The rate of dissolution of a particular solid base-soluble material at a particular temperature and in contact with a fluid or fluids of a particular pH is readily determined by the simple laboratory experiment of exposing the solid base-soluble material to the fluid or fluids under treatment conditions. Naturally, a solid base-soluble material is selected that a) dissolves at the desired rate and b) is compatible with and does not interfere with the function of other components of the fluid.

The particle sizes of the individual components of the mixture may be the same or different. The particle sizes depend primarily upon the pore size distribution of the rock onto which the filter cake is to be deposited and the conditions under which the filter cake destruction will take place. Criteria for, and methods of, choosing the optimal particle sizes or particle size distributions for fluid loss additives and filter cake components are well known. The rates at which particles of a given composition and size will dissolve in a given basic fluid at a given temperature can be determined by experiment. Particle sizes or size distributions may be selected as a compromise between those that are optimal for fluid loss control or filter cake formation and those that are optimal for subsequent dissolution at the desired time and rate.

The optimal size or size distribution and concentration for fluid loss control can be determined by choosing the desired leak-off parameters and measuring leak-off with samples of the intended fluids and of the formation or of a rock similar to the formation. Leak-off is defined by the "spurt", which is the initial rapid leak-off of fluid before a filter cake barrier is formed on the fracture face (or laboratory sample face), and by the subsequent leak-off that occurs even after a filter cake is formed and is governed by the viscosity and the wall-building propensity of the fluid and its components. Leak-off is typically measured in units of volume or mass per unit area per unit time; for a fixed geometry in the laboratory, it may be measured simply by mass or volume as a function of time. Measurement of leak-off, and control of leak-off by formation of a filter cake with a fluid loss additive, are familiar to those of ordinary skill in the arts of well stimulation and sand control.

A particular advantage of these materials is that the solid base-soluble materials and the generated products are nontoxic and are biodegradable. Many of the solid base-soluble materials of the Invention are often used as self-dissolving sutures.

The Invention is carried out by determining, sometimes first by experiment and usually finally by computer simulation and modeling, the optimal amounts of FLA and the stage(s) in which it should be included so that a suitable filter cake forms. One skilled in the art of stimulation of subterranean wells and formations can readily do this with a knowledge of the formation and conditions (especially time and temperature) involved. The design process can be done for example by adjusting the job pumping design, including iteratively, usually by modeling until the desired result is predicted. FLA will always be in the pad. An FLA does not necessarily have to be in all of the proppant-containing stages, or any of the proppant-containing stages, if a satisfactory filter cake has already been formed. The type or concentration of FLA may be different in the pad and the various proppant stages.

This use of a base to dissolve the filter cake during a fracturing job is opposite to what is normally done in conventional fracturing, in which removal of the filter cake during the job is undesirable.

It is normally desirable for the filter cake to degrade after stimulation applications in order to reduce the fracture face "skin" damage and to provide maximal flow of fluids from the matrix into the fracture and ultimately into the wellbore. Similarly it is desirable for the filter cake formed in gravel packing to degrade. This degradation normally occurs naturally, albeit slowly, by thermal processes, or by dissolution of the filter cake in typical slurry fluids, or by the inclusion of breakers in the carrier fluids, or by physical processes, in particular due to the reversal of flow (during the treatment flow is out of the fracture and into the formation, and after production begins the flow is out of the formation and into fracture). Because deliberate degradation of the filter cake by the method of the Invention can bring about much faster and more complete degradation, fluid production may begin immediately after the job and may be at a higher rate than would be obtained with other methods of filter cake degradation.

If the use of fibers is also planned to aid in inducing a TSO, the fiber is usually in at least the first proppant stages and the concentration is chosen so that the fiber/proppant slurry packs off (is no longer mobile) and causes a TSO when the degradation of the filter cake has proceeded to the point where the fluid efficiency is less than for example about 20%. Note that the amount of fiber needed to cause a TSO in the method of this Invention can be less than the amount of fiber normally used in fracturing to prevent proppant flowback without causing a TSO because in the method of this Invention, another action is taken to degrade the filter cake and thus to increase the concentration of the fiber/proppant slurry in the fracture. In other words, bridging is promoted by deliberately enhancing the leak-off. On the other hand, the amount of fiber used may also be more than that normally used for preventing proppant flowback.

The treatment is performed in the usual way with the usual equipment, chemicals, and personnel, but with the equipment modified to give the ability to add fiber, or other bridging-promoting material, if that ability is not already present and if one of the embodiments to be used involves the addition of fiber. Methods of adding fiber are described in U.S. Pat. Nos. 5,501,275; and 5,782,300. A preferred, but not limiting, method of adding fiber is to add it to the fluid at the same time as the addition of the proppant. Although we have used the term "fiber," other materials could also be used as bridging-promoting materials, such as needles, fibrillated fibers, platelets, and ribbons, especially materials with aspect ratios greater than about three. Any organic or inorganic, natural or synthetic, material is suitable that would decrease the mobility of a fluid/proppant slurry as it dewaters. Fibers with aspect ratios greater than about three would be more effective when mixed with proppants because they would tend to leave a proppant pack with a greater permeability.

Fiber, or other bridging-promoting material, may be added in a sufficiently high concentration to induce a tip screenout, as described in U.S. patent application Ser. No. 10/214,817 filed Aug. 8, 2002, hereby incorporated by reference, which has a common assignee as the present application. However, bridging-promoting materials need not be added in an amount sufficient to cause a tip screenout in the present Invention, when they are used. The densities of fibers, proppants and fluids each can vary, so the amount of fiber that will be high enough to induce a tip screenout, alone or in conjunction with a filter cake degradation agent, depends upon the specific choices of fibers, proppants and fluids. The following discussion will be in terms of aqueous liquids and preferred fibers of the Invention, synthetic organic polymeric fibers having relatively low densities of from about 1 to about 1.5 grams/cubic centimeter. However, denser fibers, such as those made from inorganic materials such as glass or ceramics, can also be used; such fibers will have densities of up to double or more the densities of synthetic organic polymeric fibers. The amount of fiber in a liquid/fiber/proppant slurry necessary to induce a tip screenout when used in conjunction with a filter cake comprising a solid base-soluble material and subsequent injection of a base is most closely related to the volume of fiber per volume of fiber/proppant mixture. Thus the amounts of fiber expressed below should be adjusted for the densities of the specific components involved. The higher the density of the fiber, the higher the necessary weight concentration. Also, the aspect ratio, the length, and the diameter of the fiber relative to the diameter of a proppant will affect the amount of fiber (expressed in weight percent of liquid in the slurry) in a liquid/fiber/proppant slurry necessary to induce a tip screenout. A lower weight percent of fiber (expressed in weight percent of liquid in the slurry) will be necessary as the fiber diameter is decreased or the fiber length or aspect ratio are increased. These adjustments are well within the ability of those skilled in the art. Particularly suitable, but not limiting, fibers and other materials are described in U.S. Pat. Nos. 5,330,005; 5,439,055; 5,501,275; and 5,782,300, which are hereby incorporated by reference.

What we term "fibers" can be any fibrous material, such as natural organic fibers, synthetic organic fibers (by non-limiting example polyaramide or polyamide or novoloid or a novoloid-type polymer), fibrillated synthetic organic fibers, glass fibers, carbon fibers, ceramic fibers, inorganic fibers, metal filaments or mixtures thereof. The fibrous material preferably has a length of about 2 to about 30 nanometers and a diameter of about 10 to about 100 microns, most preferably a length of about 2 to about 30 nanometers and a length of about 10 to about 100 microns. Fiber cross-sections need not be circular and fibers need not be straight. If fibrillated fibers are used, the diameters of the individual fibrils can be much smaller than the aforementioned fiber diameters. However, as the fracture fluid/fiber/proppant mixture enters the formation, the proppant and fiber will concentrate due to fluid leak-off. At higher concentrations the fiber greatly increases the slurry's propensity to bridge. When the fiber concentration is increased to about 4 to about 5 weight percent by leak-off, the slurry has an appearance of wet pulp. It has been shown in the laboratory and in yard tests that about 4 to about 5 percent synthetic organic polymer fiber in the liquid can plug a slot 6 to 12 millimeters wide. Therefore, as the fiber and proppant are concentrated in the fracture due to fluid leak-off, the slurry will have a great propensity for the proppant/fiber mixture to bridge and cause a screenout.

The amount of synthetic organic polymer fiber is preferably adjusted over the range from about 0.5 to about 2 weight percent to account for variations in fluid efficiency. Normally, 0.5 weight percent synthetic organic polymer fiber would not be considered high and would not cause a screenout. However, one object of the Invention is to use a fiber concentration that would result in a screenout. In some cases, for example if the fluid leak-off coefficient is relatively high, and the fluid efficiency low, then the initial fiber concentration could be reduced to about that amount. The concentration might then be in the "normal" range for a "normal" treatment, but it would be high for the treatment in question. On the other hand, if the fluid efficiency were to be unusually high, then the initial fiber concentration should be increased beyond the typical 2 percent to induce a tip screenout. Thus the range of synthetic organic polymer fiber concentration of the Invention is from about 0.5 weight percent of the liquid to about 3 weight percent, preferably from about 1 weight percent to about 2 weight percent. In this context, by "high concentration" we mean a concentration of a specific fiber, in a specific liquid/fiber/proppant combination, high enough to very significantly increase the probability of a screenout under the conditions of the treatment.

Although in conventional hydraulic fracturing the amount of fiber used is normally determined by the amount of proppant used, so that the amount of fiber is changed if the amount of proppant is changed in different stages, in the method of this Invention the amount of fiber used is more commonly determined by the amount of liquid used and it is more common to use a constant amount of fiber by weight of liquid.

As fiber stiffness or rigidity increases, so does the propensity to initiate bridging and screenout. However, fluid handling will become more difficult as stiffness increases. Fibers of varying stiffness or rigidity are readily available commercially. Furthermore, friction pressure during pumping often decreases due to the addition of fibers. This is an added benefit particularly in combined fracturing/gravel packing operations where the fluid is often pumped through small ports and passages. The choice of fiber can readily be made by one of ordinary skill in the art by considering the various advantages and disadvantages of different fibers as regards to cost, availability, concentration needed, ease of handling, effect on friction pressure and other factors.

Although we have described the use of fiber addition to help induce a TSO, it would be within the scope of the Invention to employ fibers for the more conventional purpose of reducing or preventing particle production. Although gravel packing, or fracturing followed by gravel packing, is more commonly performed with a screen in place, it is within the scope of the Invention to apply the fluids and methods to treatments that are done without a screen. Although we have described the Invention in terms of hydrocarbon production, it is within the scope of the Invention to use the fluids and methods in wells intended for the production of other fluids such as water or brine, and in injection, production, or storage wells. Although we have described the Invention in terms of unfoamed fluids, fluids foamed or energized (for example with nitrogen, carbon dioxide or mixtures thereof) may be used; adjustments to the concentrations of all fluid components (including fiber and proppant) due to any consequent changes in the fluid properties would be made. It is also to be understood that the fluids and methods of the Invention may be used to cause tip screenouts in multiple fractures, natural fractures, or wormholes or the like created by treatment with acid. Any of the methods of the Invention can be carried out with coiled tubing.

Any proppant (gravel) can be used, provided that it is compatible with the base and the bridging-promoting materials if the latter are used, the formation, the fluid, and the desired results of the treatment. Such proppants (gravels) can be natural or synthetic, coated, or contain chemicals; more than one can be used sequentially or in mixtures of different sizes or different materials. Proppants and gravels in the same or different wells or treatments can be the same material and/or the same size as one another and the term "proppant" is intended to include gravel in this discussion. In general the proppant used will have an average particle size of from about 0.15 mm to about 2.5 mm, more particularly, but not limited to typical size ranges of about 0.25–0.43 mm, 0.43–0.85 mm, 0.85–1.18 mm, 1.18–1.70 mm, and 1.70–2.36 mm. Normally the proppant will be present in the slurry in a concentration of from about 0.12 kg proppant added to each L of carrier fluid to about 3 kg proppant added to each L of carrier fluid, preferably from about 0.12 kg proppant added to each L of carrier fluid to about 1.5 kg proppant added to each L of carrier fluid.

Any additives normally used in such treatments may be included, again provided that they are compatible with the other components and the desired results of the treatment. Such additives can include, but are not limited to antioxidants, corrosion inhibitors, biocides, buffers, etc. The wellbores treated can be vertical, deviated or horizontal. They can be completed with casing and perforations or open hole.

A further advantage to the method of the Invention is that the operator need not design a job that will screen out. Thus in situations in which the operator may not wish to decrease the pad volume, slow the pumps, decrease the proppant loading, or make other design changes, he may still screen out when he chooses by adding base. Thus, although it is an option to design the treatment so that screenout would probably occur even without the addition of base and then to add base in order to ensure a screenout, it is equally within the scope of the Invention to design a treatment that probably will not screen out without the addition of base, and then to add base. It is also within the scope of this Invention to design and start pumping a treatment that is not designed or expected to screen out at any point during the treatment and then during the treatment to decide to cause the treatment to screen out and therefore at that point to add base and cause the screenout.

It should be pointed out that although it is not desirable for the screenout to occur in the wellbore, in the annulus between a screen (if present) and the wellbore face, or in the perforations, it is desirable that these regions be fully packed at the end of the job. That is, the desired result is to screen off in the fracture (the origination of the screenout is in the fracture) and then to fill (or "pack") the above-mentioned regions with proppant/gravel.

It should be understood that breakers and breaker aids may also be included in job designs for the purpose of degrading the surfactant viscosifying agent in the carrier fluid. Degradation of the viscosifying agent must occur after degradation of the filter cake; that is, the carrier fluid must be capable of transporting proppant until the treatment has been completed. The choice of breakers, and breaker aids, and the timing and concentration of their addition must be consistent with the addition of base to destroy the filter cake. Preferably, any breaker or breaker aid (and any other additive in the system) should be insensitive to and compatible with, base. For example, a slow acting breaker that is insufficiently active to degrade the filter cake during the job but sufficiently active to degrade the viscosifying agent within an acceptable time after pumping has ceased may be added at any point during a job, independent of the addition of base.

This Invention may be practiced at any formation temperature, taking into account any cool-down that may occur, at which the pad and fracture fluids and their components, in particular the VES and micelles in the pad and the fracture fluid, have the needed properties, in particular stability.

EXAMPLE 1

Figure 1:
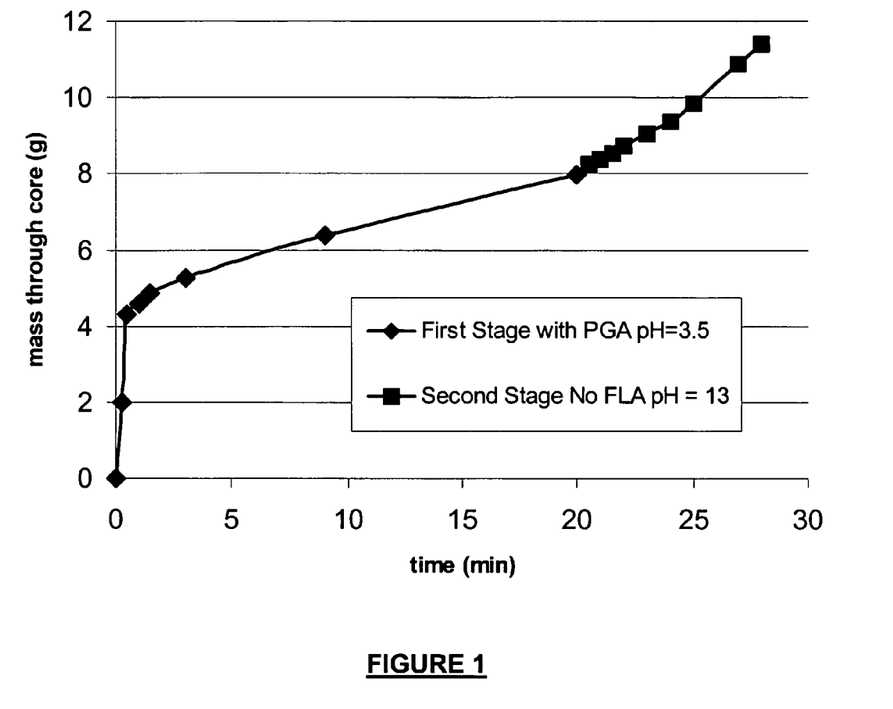
FIG. 1 shows the change in flow rate through a filter cake of the Invention with an increase in the pH.

To demonstrate an embodiment of the Invention, a static fluid loss cell was set up with a Berea sandstone core of 200 mD permeability. A viscoelastic fluid containing PGA was prepared by dispersing 0.5 weight percent PGA in water, adding 0.2% sodium sesquicarbonate buffer to keep the pH at about 10, and then adding 6 weight percent of a concentrate that contained about 40 weight percent of erucic amidopropyl dimethyl betaine, about 5 weight percent sodium chloride, about 22 weight percent isopropanol, about 1 weight percent polynaphthalene sulfonate, and about 5 weight percent water. This fluid was prepared in a Waring blender at "moderate" speed. The PGA used was Dupont TLF 6267, described by the supplier as a crystalline material having a glass transition temperature of about 49° C., a melting point of about 200 to 210° C., a molecular weight of about 600, and a mean particle size of about 8 to 15 microns. This fluid was pumped through the core with a differential pressure of about 3.45 MPa for 20 minutes. The mass through the core was captured on a balance, and the weight was recorded as a function of time as shown in FIG. 1. At the end of 20 minutes, flow through the core had been reduced to a rate of less than 0.2 ml/min. After 20 minutes, the fluid in the cell was replaced by a similar viscoelastic fluid, but without any fluid loss additive. Caustic (NaOH) had been added to this second fluid to raise the pH up to approximately 13. In this second stage the filter cake created by the first stage was hydrolyzed. When flow through the core was resumed at about 3.45 MPa differential pressure, the fluid loss quickly increased to a more rapid rate than had been observed in the first stage. After four minutes into the second stage, the fluid loss rate was more than 0.4 ml per minute.

In this experiment the first stage of the test corresponded to the initial pad stage of an actual treatment, and showed that the polyglycolic acid particles provided fluid loss control by generating a filter cake. The second stage showed that injection of a high pH fluid destroyed the control by dissolving at least a substantial portion of the filter cake and allowing fluid loss to resume at an increased rate. This second stage corresponded to the stage(s) in an actual treatment in which base was included, for example the proppant stages.

EXAMPLE 2

The ease of hydrolysis and dissolution of Dupont PGA TLF 6267 was determined by suspending samples of the PGA in water adjusted to different pH's. 0.2 Weight percent sodium sesquicarbonate was used to buffer at pH 10. For pH 12 the fluid was adjusted by adding either KOH and NaOH with identical results. The suspensions were heated to the desired temperature, held at that temperature without stirring for the indicated time, and the results were noted. The PGA was considered dissolved when none was visible in the solution to the unaided eye. Results are given in Table 1, and show how simple experiments can be used to determine the pH at which a given solid base-soluble material will dissolve at a given temperature in a given amount of time.

| pH | Temperature, ° C. | Dissolution time |
|---|---|---|
| 10 | 66 | ~10 hours |
| 12 | 66 | <1 hour |
| 10 | 116 | <1 hour |

The preceding description of specific embodiments of the present Invention is not intended to be a complete list of every possible embodiment of the invention. Persons skilled in this field will recognize that modifications can be made to the specific embodiments described here that would be within the scope of the present Invention.

The invention claimed is:

1. A method of causing a screenout in a subterranean formation stimulation treatment comprising injecting a slurry of a proppant in a viscoelastic surfactant based carrier fluid above fracturing pressure to create one or more fractures, comprising:
   a) forming a filter cake comprising a solid base-soluble material, and
   b) degrading the solid base-soluble material with a solid base-soluble material degradation agent while injecting a slurry of a proppant in a carrier fluid.

2. The method of claim 1 wherein the degradation agent is added during the entire treatment.

3. The method of claim 1 wherein the degradation agent is added to the slurry.

4. The method of claim 1 wherein the solid base-soluble material degradation agent is the carrier fluid.

5. The method of claim 4 wherein the carrier fluid further comprises a buffer.

6. The method of claim 1 wherein the solid base-soluble material degradation agent is a base.

7. The method of claim 6 wherein the base is selected from the group consisting of alkali metal alkoxides, alkali metal carbonates, alkali metal bicarbonates, alkali metal hydroxides, ammonium hydroxide, and mixtures thereof.

8. The method of claim 7 wherein the solid base-soluble material comprises polyglycolic acid.

9. The method of claim 7 wherein the solid base-soluble material is mixed with a solid acid-reactive material.

10. The method of claim 9 wherein the solid acid-reactive material is selected from the group consisting of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass.

11. The method of claim 9 wherein particles of the solid base-soluble material are physically mixed with particles of the solid acid-reactive material.

12. The method of claim 9 wherein the solid base-soluble material is in the same particle as the solid acid-reactive material.

13. The method of claim 12 wherein the solid acid-reactive material is surrounded by the solid base-soluble material.

14. The method of claim 13 wherein the solid base-soluble material surrounding the solid acid-reactive material is coated with a hydrolysis-delaying material.

15. The method of claim 1 wherein the filter cake comprises a fluid loss additive selected from the group consisting of water-soluble polymers, crosslinked water-soluble polymers, asbestos, starch, calcium carbonate, mica, plastic particles, solid wax, wax-polymer particles, insoluble salts, slowly soluble salts, and mixtures thereof, provided that at least one component can be broken or dissolved.

16. The method of claim 1 wherein the solid base-soluble material is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

17. The method of claim 1 wherein the pH of the fluid is at least about 10.

18. A method of causing a screenout in a subterranean formation stimulation treatment comprising injecting a slurry of a proppant in a viscoelastic surfactant based carrier fluid above fracturing pressure to create one or more fractures, comprising the steps of:
    a) injecting a pad fluid that forms a filter cake,
    b) injecting one or more first slurry stages comprising a proppant in a carrier fluid; and
    c) degrading the filter cake with a filter cake degradation agent while injecting one or more second slurry stages comprising a proppant in a carrier fluid.

19. The method of claim 18 wherein the filter cake degradation agent is a base.

20. The method of claim 18 wherein the pad fluid comprises a member of the group consisting of solid base-soluble materials, fluid loss additives, filter cake degradation agents, and mixtures thereof.

21. The method of claim 18 wherein the one or more first slurry stages comprise a member of the group consisting of solid base-soluble materials, fluid loss additives, filter cake degradation agents, and mixtures thereof.

22. The method of claim 18 wherein the one or more second slurry stages comprise a member of the group consisting of solid base-soluble materials, fluid loss additives, filter cake degradation agents, and mixtures thereof.

23. The method of claim 18 wherein one or more of the pad fluid, the one or more first slurry stages, and the one or more second slurry stages comprise a bridging-promoting material.

24. The method claim 18 wherein the degradation agent is added to the pad.

25. The method claim 18 wherein the degradation agent is added to the first slurry stages.

26. The method claim 18 wherein the degradation agent is added to the second slurry stages.

27. A method of gravel packing a subterranean formation, comprising injecting a slurry of a gravel in a viscoelastic surfactant based carrier fluid, comprising:
    a) forming a filter cake comprising a solid base-soluble material, and
    b) degrading the filter cake with a filter cake degradation agent while injecting a slurry of a gravel in a carrier fluid.

28. The method of claim 27 wherein the slurry comprises a bridging-promoting material.

29. The method of claim 27 wherein a sand control screen is in place before the treatment.

\* \* \* \* \*